(12) United States Patent
Huang et al.

(10) Patent No.: US 11,956,261 B2
(45) Date of Patent: Apr. 9, 2024

(54) DETECTION METHOD FOR MALICIOUS DOMAIN NAME IN DOMAIN NAME SYSTEM AND DETECTION DEVICE

(71) Applicant: Acer Cyber Security Incorporated, Taipei (TW)

(72) Inventors: Chiung-Ying Huang, Taipei (TW); Yi-Chung Tseng, Taipei (TW); Ming-Kung Sun, Taipei (TW); Tung-Lin Tsai, Taipei (TW)

(73) Assignee: Acer Cyber Security Incorporated, Taipei (TW)

( * ) Notice: Subject to any disclaimer, the term of this patent is extended or adjusted under 35 U.S.C. 154(b) by 414 days.

(21) Appl. No.: 17/317,921

(22) Filed: May 12, 2021

(65) Prior Publication Data
US 2021/0360013 A1    Nov. 18, 2021

(30) Foreign Application Priority Data

May 18, 2020    (TW) .................................. 109116347

(51) Int. Cl.
*H04L 9/40* (2022.01)
*G06N 5/04* (2023.01)
*G06N 20/00* (2019.01)

(52) U.S. Cl.
CPC .......... *H04L 63/1425* (2013.01); *G06N 5/04* (2013.01); *G06N 20/00* (2019.01); *H04L 63/145* (2013.01); *H04L 63/1483* (2013.01)

(58) Field of Classification Search
CPC ............... H04L 63/1425; H04L 63/145; H04L 63/1483; H04L 61/3025; H04L 61/4511; H04L 2463/144; H04L 63/1408; G06N 5/04; G06N 20/00
See application file for complete search history.

(56) References Cited

U.S. PATENT DOCUMENTS

| | | | |
|---|---|---|---|
| 8,402,543 B1 | 3/2013 | Ranjan et al. | |
| 8,762,298 B1 * | 6/2014 | Ranjan .................. | G06F 21/552 706/12 |

(Continued)

FOREIGN PATENT DOCUMENTS

| | | |
|---|---|---|
| CN | 102841990 | 12/2012 |
| CN | 103581363 | 2/2014 |

(Continued)

OTHER PUBLICATIONS

"Search Report of Europe Counterpart Application", dated Sep. 29, 2021, p. 1-p. 6.

(Continued)

*Primary Examiner* — Ponnoreay Pich
*Assistant Examiner* — Mudasiru K Olaegbe
(74) *Attorney, Agent, or Firm* — JCIPRNET

(57) ABSTRACT

A detection method for a malicious domain name in a domain name system (DNS) and a detection device are provided. The method includes: obtaining network connection data of an electronic device; capturing log data related to at least one domain name from the network connection data; analyzing the log data to generate at least one numerical feature related to the at least one domain name; inputting the at least one numerical feature into a multi-type prediction model, which includes a first data model and a second data model; and predicting whether a malicious domain name related to a malware or a phishing website exists in the at least one domain name by the multi-type prediction model according to the at least one numerical feature.

16 Claims, 4 Drawing Sheets

(56) References Cited

U.S. PATENT DOCUMENTS

| | | | |
|---|---|---|---|
| 2015/0373039 A1* | 12/2015 | Wang | H04L 63/1425 |
| | | | 726/23 |
| 2016/0065597 A1* | 3/2016 | Nguyen | H04L 63/1441 |
| | | | 726/22 |
| 2016/0294773 A1* | 10/2016 | Yu | H04L 63/1425 |
| 2018/0069883 A1* | 3/2018 | Meshi | H04L 63/1425 |
| 2018/0176232 A1* | 6/2018 | Rodriguez | H04L 61/4511 |
| 2020/0059451 A1* | 2/2020 | Huang | G06N 3/044 |
| 2020/0137094 A1* | 4/2020 | Janakiraman | G06N 20/00 |
| 2021/0099414 A1* | 4/2021 | Liu | H04L 63/0236 |
| 2023/0254330 A1* | 8/2023 | Singh | G06F 11/323 |
| | | | 726/23 |

FOREIGN PATENT DOCUMENTS

| | | |
|---|---|---|
| CN | 105072214 | 11/2015 |
| CN | 106713303 | 5/2017 |
| CN | 108200054 | 6/2018 |
| TW | I677803 | 11/2019 |

OTHER PUBLICATIONS

Hajara Musa et al., "A Comparative Analysis of Phishing Website Detection Using XGBOOST Algorithm," Journal of Theoretical and Applied Information Technology, vol. 97, No. 5, Mar. 15, 2019, pp. 1434-1443.

\* cited by examiner

DETECTION METHOD FOR MALICIOUS DOMAIN NAME IN DOMAIN NAME SYSTEM AND DETECTION DEVICE

CROSS-REFERENCE TO RELATED APPLICATION

This application claims the priority benefit of Taiwan application serial no. 109116347, filed on May 18, 2020. The entirety of the above-mentioned patent application is hereby incorporated by reference herein and made a part of this specification.

BACKGROUND

Technical Field

This disclosure relates to an information security technology, and in particular to a detection method for a malicious domain name in a domain name system (DNS) and a detection device.

Description of Related Art

The DNS is a service of the Internet that acts as a distributed database for mapping the domain name and the Internet Protocol (IP) address with each other, making it more convenient for people to access the Internet. However, due to the rapid growth of the domain names, tens of thousands of domain names are generated every day. In addition to a large number of normally used domain names (also known as benign domain names), there are also domain names used to perform harmful activities (also known as malicious domain names). The malicious domain names are commonly used in phishing attacks and the spread of malware. The phishing websites usually refer to unofficial websites disguised as bank websites, online shopping websites, or websites that store important personal information, so as to trick the user into inputting the actual account number and password of the user into the phishing website to obtain the access rights of the user on the website. When an attack is successful, the personal privacy and property of the user is threatened, impacted, and damaged to a certain extent. In addition, if a malware is installed on the computer of the user, an attacker may control the computer of the victimized user or obtain important information of the victimized user using the malware.

Generally, computer forensics personnel use reverse engineering to find malicious domain names. However, manual analysis and identification cost a lot of time. Even if the list of malicious domain names is continuously obtained, updated, and mastered, the speed is still far behind the speed of generating new domain names. Therefore, there is an actual need to provide a more effective detection mechanism for malicious domain names.

SUMMARY

This disclosure provides a detection method for a malicious domain name in a domain name system (DNS) and a detection device, which can effectively improve the detection efficiency of automated malicious domain name detection.

An embodiment of the disclosure provides a detection method for a malicious domain name in a DNS, which includes the following steps. Network connection data of an electronic device is obtained. Log data related to at least one domain name is captured from the network connection data. The log data is analyzed to generate at least one numerical feature related to the at least one domain name. The at least one numerical feature is inputted into a multi-type prediction model, which includes a first data model and a second data model, wherein the first data model is built based on a first malicious feature related to a malware, and the second data model is built based on a second malicious feature related to a phishing website. Whether a malicious domain name related to the malware or the phishing website exists in the at least one domain name is predicted by the multi-type prediction model according to the at least one numerical feature.

An embodiment of the disclosure further provides a detection device for detecting a malicious domain name in the DNS. The detection device includes a web interface and a processor. The web interface is configured to obtain network connection data of an electronic device. The processor is coupled to the web interface. The processor is configured to capture log data related to at least one domain name from the network connection data. The processor is further configured to analyze the log data to generate at least one numerical feature related to the at least one domain name. The processor is further configured to input the at least one numerical feature into a multi-type prediction model, which includes a first data model and a second data model. The first data model is built based on a first malicious feature related to a malware. The second data model is built based on a second malicious feature related to a phishing website. The processor is further configured to operate the multi-type prediction model to predict whether a malicious domain name related to the malware or the phishing website exists in the at least one domain name according to the at least one numerical feature.

Based on the above, after obtaining the network connection data of the electronic device, the log data related to the at least one domain name may be captured from the network connection data. Then, the log data may be analyzed to generate the at least one numerical feature related to the at least one domain name, and the numerical feature is inputted into the multi-type prediction model. In particular, the multi-type prediction model includes the first data model and the second data model. The first data model is built based on the first malicious feature related to the malware. The second data model is built based on the second malicious feature related to the phishing website. Then, the multi-type prediction model may predict whether the malicious domain name related to the malware or the phishing website exists in the at least one domain name according to the at least one numerical feature. As such, the detection efficiency of automated malicious domain name detection can be effectively improved.

DESCRIPTION OF THE EMBODIMENTS

Figure 1:
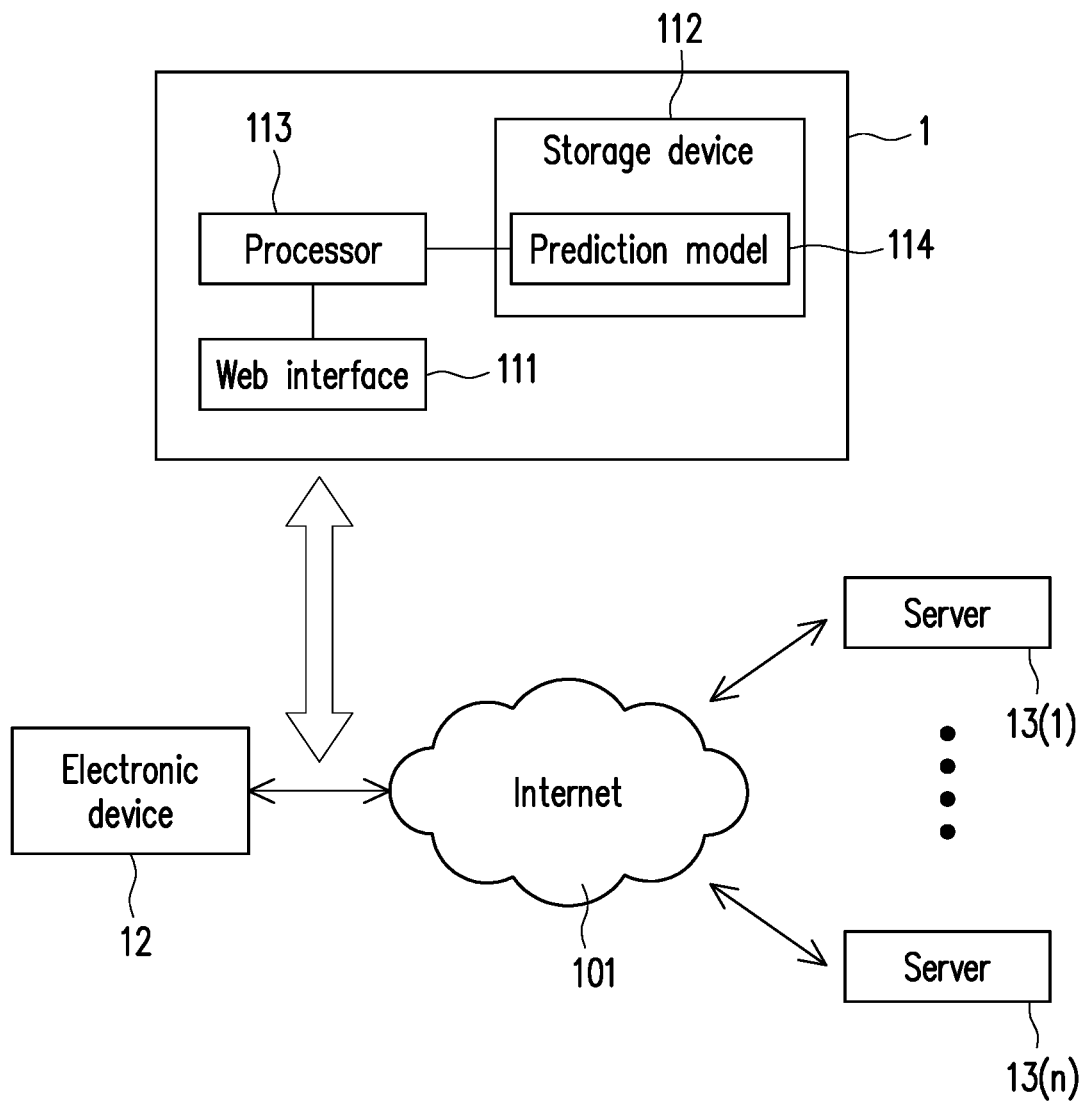
FIG. 1 is a schematic diagram of a domain name analysis system according to an embodiment of the disclosure.

FIG. 1 is a schematic diagram of a domain name analysis system according to an embodiment of the disclosure. Referring to FIG. 1, a domain name analysis system includes an detection device 1 and an electronic device 12. The electronic device 12 may be connected to at least one of servers 13(1) to 13(n) via an Internet 101. In particular, the electronic device 12 may be connected to at least one of the servers 13(1) to 13(n) via one or more domain names. A domain name may be composed of a character string separated by one or more dots (for example, www.google.com).

When the electronic device 12 intends to connect to a particular domain name, through the analysis of the domain name system (DNS), the domain name may be directed to an Internet Protocol (IP) address of a particular server 13(i) in the servers 13(1) to 13(n). At this point of time, the electronic device 12 may connect to the server 13(i) according to the IP address. Compared with memorizing the IP address of the server 13(i), the domain name used by the server 13(i) is more convenient for the user to remember.

In an embodiment, the detection device 1 may automatically analyze the network connection data of the electronic device 12. Then, the detection device 1 may automatically predict whether the domain name used by any one of the servers 13(1) to 13(n) is a malicious domain name according to an analysis result. Do note that, in the embodiment of FIG. 1, the detection device 1 and the electronic device 12 are independent electronic devices (or computer devices). However, in another embodiment, the detection device 1 may also be disposed in the electronic device 12 in the form of a software or hardware.

In an embodiment, the detection device 1 includes a web interface 111, a storage device 112, a processor 113, and a prediction model 114. The web interface 111 may be configured to connect to the electronic device 12, so as to obtain the network connection data of the electronic device 12. For example, the web interface 111 may include a web interface card. The storage device 112 is configured to store the obtained network connection data and the prediction model 114. For example, the storage device 112 may include a volatile storage circuit and a non-volatile storage circuit. The volatile storage circuit may include a random access memory. The non-volatile storage circuit may include a flash memory or a traditional hard disk drive (HDD).

The prediction model 114 may include one or more artificial intelligence models, one or more machine learning models, and/or one or more deep learning models. For example, the prediction model 114 may include multi-decision tree model such as XGBoost model or other types of algorithm models. The prediction model 114 may be configured to automatically detect whether a particular domain name is a malicious domain name according to data captured from the network connection data of the electronic device 12. In an embodiment, the prediction model 114 may further identify whether the type of the detected malicious domain name belongs to a malware or a phishing website. If a particular malicious domain name belongs to a malware, the electronic device 12 may download one or more malwares from the server to become an infected device after connecting to the server using the particular malicious domain name. Thereafter, the electronic device 12 may become a zombie computer to be controlled by the hacker at any time. In addition, if a particular malicious domain name belongs to a phishing website, after the electronic device 12 connects to a server using the malicious domain name, all sensitive information sent by the user to the server may be collected and used to steal personal information, money, etc. of the user.

In an embodiment, the prediction model 114 is also known as a multi-type prediction model. The prediction model 114 may include multiple types of data models. Each data model in the prediction model 114 may be built according to a specific type of malicious feature and may be configured to detect a malicious domain name belong to the specific type. In an embodiment, each data model in the prediction model 114 may operate independently. In an embodiment, multiple data models in the prediction model 114 may also cooperate with each other.

In an embodiment, the prediction model 114 includes at least a first data model and a second data model. The first data model is built mainly based on malicious features related to a malware (also known as a first malicious feature). The second data model is built mainly based on malicious features related to a phishing website (also known as a second malicious feature). For example, after training a particular data model in the prediction model 114 using a large amount of malicious features related to a malware, the first data model may be built and may be exclusively used for detecting a malicious domain name belonging to the malware. Similarly, after training a particular data model in the prediction model 114 using a large amount of malicious features related to a phishing website, the second data model is built and may be exclusively used for detecting a malicious domain name belonging the phishing website. Do note that in other embodiments, the prediction model 114 may also include other types of data models to detect other types of malicious domain names.

In an embodiment, the prediction model 114 is stored in the storage device 112 as in the form of a software. However, in another embodiment, the prediction model 114 may also be implemented as a hardware circuit to be disposed in the detection device 1 in the form of a hardware. In addition, the prediction accuracy of the prediction model 114 may be improved by training.

The processor 113 is coupled to the web interface 111 and the storage device 112. The processor 113 is responsible for analyzing the network connection data of the electronic device 12 and transmitting the analysis result to the prediction model 114 for the prediction of the malicious domain name. In an embodiment, the processor 113 may also be responsible for the overall or partial operation of the detection device 11. For example, the processor 113 may include a central processing unit (CPU), or other programmable general-purpose or special-purpose microprocessors, digital signal processors (DSP), programmable controllers, application specific integrated circuits (ASIC), programmable logic device (PLD), other similar devices, or a combination of the devices.

Figure 2:
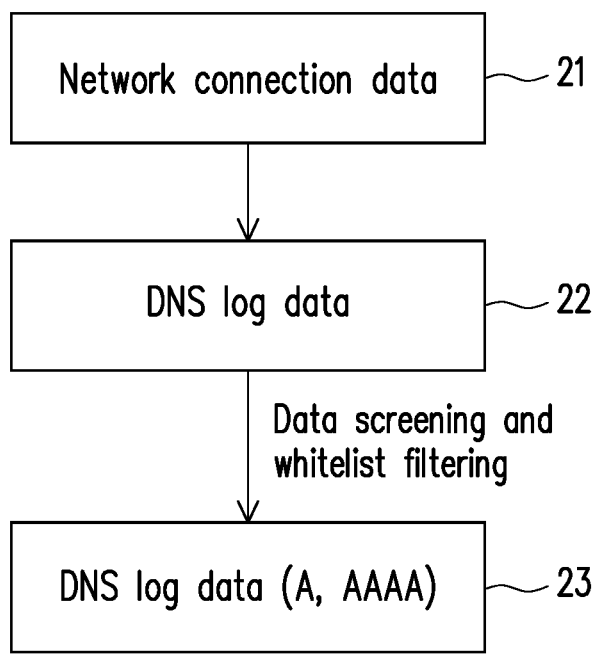
FIG. 2 is a schematic diagram of analyzing network connection data according to an embodiment of the disclosure.

FIG. 2 is a schematic diagram of analyzing network connection data according to an embodiment of the disclosure. Referring to FIGS. 1 and 2, in an embodiment, the processor 113 may use a packet recording tool (such as Zeek) to monitor network connection data 21 of the electronic device 12 and convert the network connection data 21 into log data. The processor 113 may capture the log data (also known as DNS log data) 22 related to at least one domain name from the log data. For example, the DNS log data 22 may include different types of DNS query records and response records such as A, AA, MX, NS, CNAME, and TXT.

In an embodiment, the processor 113 may perform data screening on the DNS log data 22. The data screening may be configured to filter an A record and an AAAA record in the DNS log data 22 and generate DNS log data 23. The A record reflects address data of at least one Internet Protocol version 4 (IPv4). The AAAA record reflects address data of at least one Internet Protocol version 6 (IPv6). By performing the data screening on the DNS log data 22, the A and AAAA type of query and response records in the DNS log data 22 may be retained in the DNS log data 23, while other types of query and response records (such as MX, NS, CNAME, and TXT) may be removed.

In an embodiment, the processor 113 may perform whitelist filtering on the DNS log data 22. The whitelist filtering is configured to eliminate related log data of known benign domain names in the DNS log data 22, while only retaining related log data of other domain names not recorded on the whitelist in the DNS log data 23. Therefore, the subsequent detection efficiency of malicious domain names can be improved.

A piece of log data in the DNS log data 23 may contain at least 4 data fields, which respectively record the time, query target (that is, domain name), response result (that is, IP address corresponding to the queried domain name), and time to live (TTL) of the DNS record. The processor 113 may analyze the DNS log data 23 to generate at least one numerical feature related to at least one domain name. For example, the processor 113 may analyze data related to at least one of the query behavior of at least one domain name, the mapping between at least one domain name and at least one IP address, the character composition of at least one domain name, the change of the IP address of at least one domain name, and the TTL of at least one domain name in the DNS log data 23 to obtain the numerical feature. Then, the processor 113 may run the prediction model 114 to predict whether a malicious domain name exists in the domain names involved in the DNS log data 23 according to the numerical feature.

Figure 3:
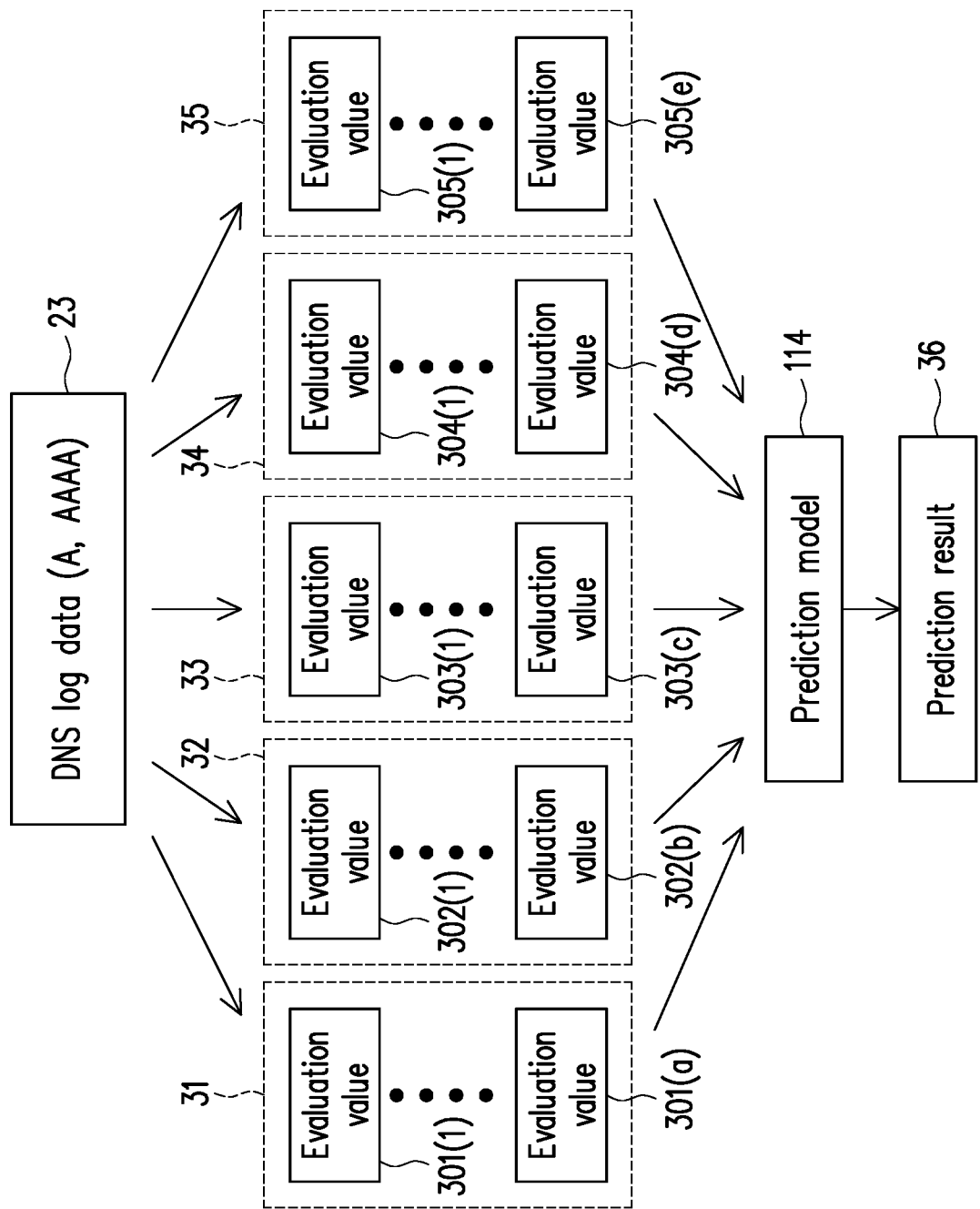
FIG. 3 is a schematic diagram of generating a prediction result according to numerical features according to an embodiment of the disclosure.

FIG. 3 is a schematic diagram of generating a prediction result according to numerical features according to an embodiment of the disclosure. Referring to FIGS. 1 and 3, in an embodiment, the processor 113 may analyze the DNS log data 23 to obtain evaluation values 301(1) to 301(a) belonging to a type 31, evaluation values 302(1) to 302(b) belonging to a type 32, evaluation values 303(1) to 303(c) belonging to a type 33, evaluation values 304(1) to 304(d) belonging to a type 34, and evaluation values 305(1) to 305(e) belonging to a type 35. The evaluation values 301(1) to 301(a), 302(1) to 302(b), 303(1) to 303(c), 304(1) to 304(d) and 305(1) to 305(e) may all reflect the malicious features of malicious domain names that may exist in the numerical form. In addition, the total number of the evaluation values 301(1) to 301(a), the total number of the evaluation values 302(1) to 302(b), the total number of the evaluation values 303(1) to 303(c), the total number of the evaluation values 304(1) to 304(d), and the total number of the evaluation values 305(1) to 305(e) may all be adjusted according to practical requirements, and the disclosure is not limited thereto.

In an embodiment of the disclosure, the processor 113 may analyze data (also referred to as first data) related to the query behavior of at least one domain name in the DNS log data 23 to obtain the evaluation values 301(1) to 301(a) belonging to the type 31 (also known as query behavior evaluation values). The evaluation values 301(1) to 301(a) may respectively reflect the statistical characteristic of the query behavior of the electronic device 12 on at least one domain name.

In an embodiment, assuming that the first data reflects that the number of queries made by the electronic device 12 on a particular domain name (also known as first domain name) in each hour of a particular day (Day 1) is recorded as [x1, x2, ..., x24] (for example, x1 is the number of queries made by the electronic device 12 on the first domain name from 0:00 to 0:59 of Day 1, x2 is the number of queries made by the electronic device 12 on the first domain name from 1:00 to 1:59 of Day 1, and so on), and the number of queries made by the electronic device 12 on the first domain name in each hour of another day (Day 2) is recorded as [y1, y2, ..., y24] (for example, y1 is the number of queries made by the electronic device 12 on the first domain name from 0:00 to 0:59 of Day 2, y2 is the number of queries made by the electronic device 12 on the first domain name from 1:00 to 1:59 of Day 2, and so on), the evaluation value 301(1) may be generated according to the following equation (1.1):

$$\text{Evaluation value } 301(1) = \sqrt{\Sigma_{i=1}^{24}(xi - yi)} \qquad (1.1)$$

The smaller the value of the evaluation value 301(1), the more consistent the query behavior of the electronic device 12 on the same first domain name within multiple time ranges in days, and the higher the probability that the electronic device 12 is infected by a malware and is repeatedly connecting to a relay station. In addition, in other embodiments, the above calculation may also be performed in the units of multiple days (for example, three days), weeks, months, or years, and the disclosure is not limited thereto.

In an embodiment, the processor 113 may obtain a difference value (that is, time difference) between a time T1 of the first occurrence and a time T2 of the last occurrence of a particular domain name (for example, the first domain name) according to the first data. The processor 113 may generate the evaluation value 301(2) according to the time difference. For example, the evaluation value 301(2) may be equal to T1−T2.

In an embodiment, the processor 113 may obtain a total number of times of the electronic device 12 connecting to a particular domain name (for example, the first domain name) within a time frame according to the first data, and determine the evaluation value 301(3) according to the total number of times. For example, if the DNS log data 23 reflects that the electronic device 12 has connected to the first domain name 20 times within a month, the evaluation value 301(3) may be set as 20.

In an embodiment, the processor 113 may obtain an average number (also known as first number of times) of connections (or queries) on a particular domain name (such as the first domain name) within multiple first time ranges and an average number (also known as second number of times) of connections (or queries) on the first domain name within multiple second time ranges according to the first data. For example, the multiple first time ranges may refer to multiple time ranges before a particular time point, and the multiple second time ranges may be multiple time ranges after the time point. The processor 113 may determine whether a variation point exists according to whether the difference between the first number of times and the second number of times is greater than a threshold. Assuming that the difference between the average number of connections (that is, the first number of times) before a particular time point and the average number of connections (that is, the second number of times) after the time point is greater than the threshold, a variation point is determined to have occurred at the time point. The processor 113 may determine the evaluation value 301(4) according to the total number of variation points occurred within a predetermined time range.

In an embodiment, the processor 113 may obtain a total number of connections (or queries) made by the electronic device 12 on a single or multiple domain names within the same time range (for example, 0:00 to 0:59) of different days (or other time units) according to the first data, and determine the evaluation value 301(5) according to the total number of connections (or queries). For example, assuming that the electronic device 12 respectively connects to the first domain name 3, 5, and 7 times from 0:00 to 0:59 each day within three days, the evaluation value 301(5) may be set as 15 (that is, 15=3+5+7).

In an embodiment, the processor 113 may analyze data (also referred to as second data) related to the mapping of at least one domain name and at least one IP address in the DNS log data 23 to obtain the evaluation values 302(1) to 302(b) belonging to the type 32 (also known as mapping evaluation values). The evaluation values 302(1) to 302(b) may respectively reflect the statistical characteristic of the mapping between at least one domain name and at least one IP address.

In an embodiment, the processor 113 may obtain a total number of countries to which one or more IP addresses mapped to a particular domain name (for example, the first domain name) belong according to the second data. The processor 113 determines the evaluation value 302(1) according to the total number of countries.

In an embodiment, the processor 113 may obtain a total number of one or more IP addresses mapped to a particular domain name (for example, the first domain name) according to the second data. The processor 113 determines the evaluation value 302(2) according to the total number of IP addresses.

In an embodiment, the processor 113 may obtain multiple IP addresses mapped to a particular domain name (for example, the first domain name) according to the second data. The processor 113 may obtain a total number of domain names mapped by the IP addresses. The processor 113 may determine the evaluation value 302(3) according to the total number of domain names.

In an embodiment, the processor 113 may query the malware information sharing platform (MISP) according to the second data to obtain whether one or more IP addresses mapped to a particular domain name (for example, the first domain name) have ever been used for malicious purposes. The processor 113 may determine a probability according to the query result to reflect the probability of the first domain name belonging to a malicious domain name. The processor 113 may determine the evaluation value 302(4) according to the probability.

In an embodiment, the processor 113 may analyze data (also referred to as the third data) related to a character composition of at least one domain name in the DNS log data 23 to obtain the evaluation values 303(1) to 303(c) belonging to the type 33 (also known as domain name evaluation values). The evaluation values 303(1) to 303(c) may respectively reflect the statistical characteristic of the character composition in at least one domain name.

In an embodiment, the processor 113 may obtain a ratio of numbers appearing in a particular domain name (for example, the first domain name) according to the third data. The processor 113 may determine the evaluation value 303(1) according to the ratio.

In an embodiment, the processor 113 may obtain a ratio of the total length of a domain name occupied by the length of the most meaningful character string in the particular domain name (for example, the first domain name) according to the third data. The processor 113 may determine the evaluation value 303(2) according to the ratio. Taking google.com as an example, wherein google is the most meaningful character string, the evaluation value 303(2) may be set as 0.6 (that is, 6/10=0.6).

In an embodiment, the processor 113 may obtain a ratio of all domain names in the DNS log data 23 occupied by a top domain of a particular domain name (for example, the first domain name) according to the third data. The processor 113 may determine the evaluation value 303(3) according to the ratio. Taking google.com as an example, the top domain name thereof is com. The processor 113 may determine the evaluation value 303(3) according to the ratio of all domain names occupied by com as the top domain of the domain name.

In an embodiment, the processor 113 may obtain the length of a third domain name of a particular domain name (for example, the first domain name) according to the third data. Taking x111.google.com as an example, wherein the third domain is x111 and the length thereof is 4. Therefore, the processor 113 may set the evaluation value 303(4) as 4.

In an embodiment, the processor 113 may obtain a total length of character string of a particular domain name (for example, the first domain name) according to the third data. The processor 113 may determine the evaluation value 303(5) according to the total length of character string.

In an embodiment, the processor 113 may analyze data (also known as fourth data) related to the TTL of at least one domain name in the DNS log data 23 to obtain the evaluation values 304(1) to 304(d) belonging to the type 34 (also known as the TTL evaluation values). The evaluation values 304(1) to 304(c) may respectively reflect the statistical characteristic of the TTL of at least one domain name.

In an embodiment, the processor 113 may obtain an average TTL of a particular domain name (for example, the first domain name) according to the fourth data. For example, assuming that multiple TTL values of the first domain name is respectively recorded as 86400, 86400, and 86400 in the DNS log data 23, the average TTL of the first domain name may be 86400. The processor 113 may determine the evaluation value 304(1) according to the average TTL.

In an embodiment, the processor 113 may obtain a standard deviation of multiple TTL of a particular domain name (for example, the first domain name) according to the fourth data. The processor 113 may determine the evaluation value 304(2) according to the standard deviation.

In an embodiment, the processor 113 may obtain a number of different TTL in multiple TTL of a particular domain name (for example, the first domain name) according to the fourth data, and determine the evaluation value 304(3) according to the number. For example, assuming that multiple TTL values of the first domain name is respectively recorded as 86400, 82000, and 86400 in the DNS log data 23, which indicates that the first domain name has 2 different TTL. Therefore, the processor 113 may set the evaluation value 304(3) as 2.

In an embodiment, the processor 113 may obtain a number of changes of TTL of a particular domain name (for example, the first domain name) according to the fourth data. The processor 113 may determine the evaluation value 304(4) according to the number of changes.

In an embodiment, the processor 113 may obtain a total number of TTL less than a predetermined time length in the TTL of a particular domain name (for example, the first domain name) according to the fourth data. For example, the predetermined time length may be 100 seconds or other time lengths. The processor 113 may determine the evaluation value 304(5) according to the total number.

In an embodiment, the processor 113 may analyze data (also known as fifth data) related to the change of IP addresses of at least one domain name in the DNS log data 23 to obtain the evaluation values 305(1) to 305(d) belonging to the type 35 (also known as address change evaluation values). The evaluation values 305(1) to 305(c) may respectively reflect the statistical characteristics of the change of the IP addresses of at least one domain name.

In an embodiment, the processor 113 may obtain a total number of a predetermined IP address in the IP addressed used by a particular domain name (for example, the first domain name) according to the fifth data. The processor 113 may determine the evaluation value 305(1) according to the total number. For example, the predetermined IP address may be 127.0.0.1, 0.0.0.0 and/or 255.255.255.255. Assuming that the DNS log data 23 reflects that the first domain name has used 127.0.0.1 once, the evaluation value 305(1) may be set as 1.

In an embodiment, the processor 113 may obtain a ratio of all IP addresses used by a particular domain name (for example, the first domain name) occupied by a predetermined IP address according to the fifth data. The processor 113 may determine the evaluation value 305(2) according to the ratio.

In an embodiment of the disclosure, the processor 113 may obtain a number of times a predetermined IP address has been changed in all IP addresses used by a particular domain name (for example, the first domain name) according to the fifth data. The processor 113 may determine the evaluation value 305(3) according to the number of times. For example, assuming that the DNS log data 23 reflects that the first domain name has been changed to use 127.0.0.1 once, the processor 113 may set the evaluation value 305(3) as 1.

It should be noted that the setting and generation method of the various types of evaluation values mentioned the abovementioned embodiments are only examples and are not intended to limit the disclosure. In some of the unillustrated embodiments, more types of evaluation values may be generated according to the information recorded in the DNS log data 23 to reflect the operation methods of different types of malwares or phishing websites, which may be involved with one or more domain names. In addition, the type of the evaluation values in FIG. 3 may also be increased or decreased according to actual requirements, and the disclosure is not limited thereto.

In an embodiment in FIG. 3, the prediction model 114 may calculate and generate a prediction result 36 according to the evaluation values 301(1) to 301(a), 302(1) to 302(b), 303(1) to 303(c), 304(1) to 304(d), and 305(1) to 305(e) related to a particular domain name (for example, the first domain name). For example, the prediction model 114 may use the XGBoost model to perform the prediction. The prediction result 36 may reflect whether the first domain name is predicted as a malicious domain name. For example, after comprehensively considering the evaluation values 301(1) to 301(a), 302(1) to 302(b), 303(1) to 303(c), 304(1) to 304(d), and 305(1) to 305(e), the generated prediction result 36 may include a probability. If the probability is higher than a decision value (for example, 0.85), the processor 113 may determine that the first domain name is a malicious domain name. On the contrary, if the probability is not higher than the decision value, the processor 113 may determine that the first domain name is not a malicious domain name.

In an embodiment of the disclosure, the prediction model 114 may further identify whether the type of the first domain name, which may be a malicious domain name, is a malware or a phishing website according to the evaluation values 301(1) to 301(a), 302(1) to 302(b), 303(1) to 303(c), 304(1) to 304(d), and 305(1) to 305(e) related to a particular domain name (for example, the first domain name). In other words, in an embodiment, the prediction result 36 may also reflect whether the type of the first domain name is a malware or a phishing web site.

In an embodiment, the domain name (for example, the first domain name) predicted as a malicious domain name may be recorded in a list for subsequent usage or verification. In an embodiment, the domain name predicted as a malicious domain name may be verified by a security personnel. The processor 113 may use the verification result to train the prediction model 114, so as to improve the prediction accuracy of the prediction model 114.

In an embodiment, the processor 113 may also extract the domain name with the probability falling within a predetermined range (for example, 0.4 to 0.6). The extracted domain name may be verified by the security personnel. The processor 113 may use the verification result to train the prediction model 114.

Figure 4:
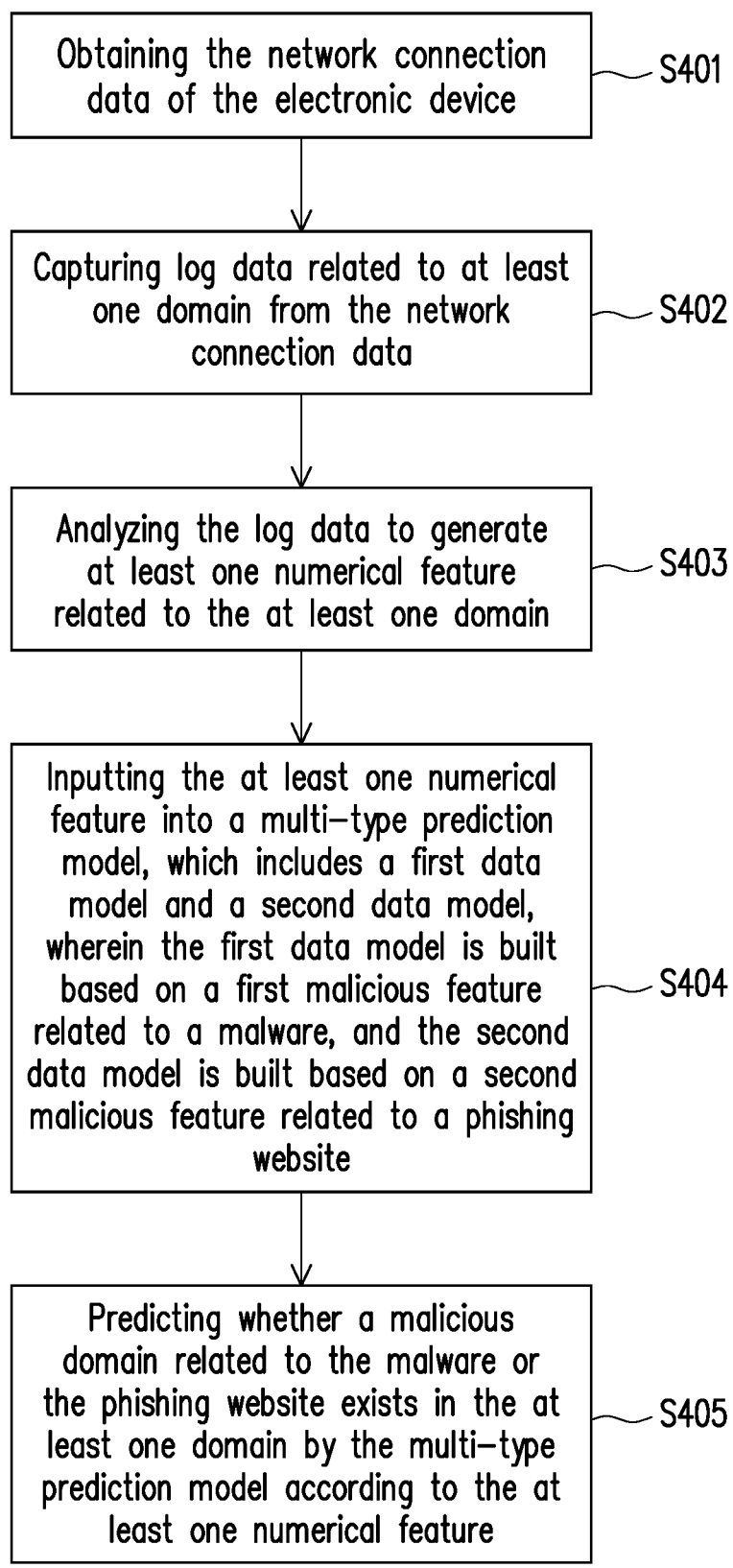
FIG. 4 is a flowchart of a detection method for a malicious domain name in a domain name system (DNS) according to an embodiment of the disclosure.

FIG. 4 is a flowchart of a detection method for a malicious domain name in a domain name system (DNS) according to an embodiment of the disclosure. Referring to FIG. 4, in Step S401, network connection data of an electronic device is obtained. In Step S402, log data related to at least one domain name is captured from the network connection data. In Step S403, the log data is analyzed to generate at least one numerical feature related to the at least one domain name. In Step S404, the at least one numerical feature is inputted into a multi-type prediction model, which includes a first data model and a second data model, wherein the first data model is built based on a first malicious feature related to a malware, and the second data model is built based on a second malicious feature related to a phishing website. In Step S405, the multi-type prediction model predicts whether a malicious domain name related to the malware or the phishing website exists in the at least one domain name according to the at least one numerical feature.

Each step in FIG. 4 has been described in detail above, so there will be no reiteration here. It is worth noting that each step in FIG. 4 may be implemented as multiple program codes or circuits, and the disclosure is not limited thereto. In addition, the method in FIG. 4 may be used with the above exemplary embodiments or may be used alone, and the disclosure is not limited thereto.

In summary, the embodiments of the disclosure propose to change a large amount of log information related to at least one domain name to be presented in the form of a numerical feature, so as to reflect or highlight the behavior of a malicious domain name that may exist. In addition, by respectively setting data models dedicated to detecting a malware and a phishing website in a multi-type prediction model, the prediction accuracy of the malware and the phishing website can be increased. Although the speed of manual analysis and search for malicious domain names is still far behind the generation speed of new domain names, the detection efficiency of malicious domain names can be effectively improved after the prediction model has performed an automated analysis on the numerical feature.

What is claimed is:

1. A detection method for a malicious domain name in a domain name system (DNS), comprising:
   obtaining network connection data of an electronic device;
   capturing log data related to at least one domain name from the network connection data;
   analyzing the log data to generate at least one numerical feature related to the at least one domain name, wherein the at least one numerical feature comprises at least one domain name evaluation value, and the at least one domain name evaluation value reflects a statistical characteristic of a character composition in the at least one domain name, wherein the at least one domain name comprises a first domain name, the statistical characteristic comprises a ratio of a first character string in the first domain name, a ratio of a second character string in all of the at least one domain name, a length of a third character string in the first domain name and a total length of fourth character strings in the first domain name;
   inputting the at least one numerical feature into a multi-type prediction model, which comprises a first data model and a second data model, wherein the first data model is built based on a first malicious feature related to a malware, and the second data model is built based on a second malicious feature related to a phishing website; and
   predicting whether a malicious domain name related to the malware or the phishing website exists in the at least one domain name by the multi-type prediction model according to the at least one numerical feature.

2. The detection method according to claim 1, wherein the step of capturing the log data related to the at least one domain name from the network connection data comprises:
   filtering an A record and an AAAA record in the log data, wherein the A record reflects address data of at least one Internet Protocol version 4 (IPv4), and the AAAA record reflects address data of at least one Internet Protocol version 6 (IPv6).

3. The detection method according to claim 1, wherein the step of analyzing the log data to generate the at least one numerical feature related to the at least one domain name comprises:
   analyzing data related to at least one of a query behavior of the at least one domain name, mapping between the at least one domain name and at least one Internet Protocol address, Raphe character composition of the at least one domain name, a change of an Internet Protocol address of the at least one domain name, and a time to live (TTL) of the at least one domain name in the log data to obtain the at least one numerical feature related to the at least one domain name.

4. The detection method according to claim 1, wherein the at least one numerical feature further comprises at least one query behavior evaluation value, and the at least one query behavior evaluation value reflects a statistical characteristic of a query behavior of the electronic device on the at least one domain name.

5. The detection method according to claim 1, wherein the at least one numerical feature further comprises at least one mapping evaluation value, and the at least one mapping evaluation value reflects a statistical characteristic of mapping between the at least one domain name and at least one Internet Protocol address.

6. The detection method according to claim 1, wherein the at least one numerical feature further comprises at least one TTL evaluation value, and the at least one TTL evaluation value reflects a statistical characteristic of a TTL of the at least one domain name.

7. The detection method according to claim 1, wherein the at least one numerical feature further comprises at least one address change evaluation value, and the at least one address change evaluation value reflects a statistical characteristic of change of an Internet Protocol address of the at least one domain name.

8. The detection method according to claim 1, wherein the step of predicting whether the malicious domain name related to the malware or the phishing website exists in the at least one domain name by the multi-type prediction model according to the at least one numerical feature comprises:
   identifying whether a type of the malicious domain name, which may exist, belongs to the malware or the phishing website by the multi-type prediction model according to the at least one numerical feature.

9. A detection device, for detecting a malicious domain name in a DNS, the detection device comprising:
   a web interface, for obtaining network connection data of an electronic device; and
   a processor, coupled to the web interface, wherein
   the processor is configured to capture log data related to at least one domain name from the network connection data,
   the processor is further configured to analyze the log data to generate at least one numerical feature related to the at least one domain name, wherein the at least one numerical feature comprises at least one domain name evaluation value, and the at least one domain name evaluation value reflects a statistical characteristic of a character composition in the at least one domain name, wherein the at least one domain name comprises a first domain name, the statistical characteristic comprises a ratio of a first character string in the first domain name, a ratio of a second character string in all of the at least one domain name, a length of a third character string in the first domain name and a total length of fourth character strings in the first domain name,
   the processor is further configured to input the at least one numerical feature into a multi-type prediction model, comprising a first data model and a second data model, wherein the first data model is built based on a first malicious feature related to a malware, and the second data model is built based on a second malicious feature related to a phishing website, and
   the processor is further configured to run the multi-type prediction model to predict whether a malicious domain name related to the malware or the phishing website exists in the at least one domain name according to the at least one numerical feature.

10. The detection device according to claim 9, wherein the operation of the processor capturing the log data related to the at least one domain name from the network connection data comprises:
    filtering an A record and an AAAA record in the log data, wherein the A record reflects address data of at least one IPv4, and the AAAA record reflects address data of at least one IPv6.

11. The detection device according to claim 9, wherein the operation of the processor analyzing the log data to generate the at least one numerical feature related to the at least one domain name comprises:
    analyzing data related to at least one of a query behavior of the at least one domain name, mapping between the at least one domain name and at least one Internet Protocol address, Raphe character composition of the at least one domain name, a change of an Internet Protocol address of the at least one domain name, and a TTL of the at least one domain name in the log data to obtain the at least one numerical feature related to the at least one domain name.

12. The detection device according to claim 9, wherein the at least one numerical feature further comprises at least one query behavior evaluation value, and the at least one query behavior evaluation value reflects a statistical characteristic of a query behavior of the electronic device on the at least one domain name.

13. The detection device according to claim 9, wherein the at least one numerical feature further comprises at least one mapping evaluation value, and the at least one mapping evaluation value reflects a statistical characteristic of mapping between the at least one domain name and at least one Internet Protocol address.

14. The detection device according to claim 9, wherein the at least one numerical feature further comprises at least one TTL evaluation value, and the at least one TTL evaluation value reflects a statistical characteristic of a TTL of the at least one domain name.

15. The detection device according to claim 9, wherein the at least one numerical feature further comprises at least one address change evaluation value, and the at least one address change evaluation value reflects a statistical characteristic of change of an Internet Protocol address of the at least one domain name.

16. The detection device according to claim 9, wherein the operation of the processor running the multi-type prediction model to predict whether the malicious domain name related to the malware or the phishing website exists in the at least one domain name according to the at least one numerical feature comprises:
  running the multi-type prediction model to identify whether a type of the malicious domain name, which may exist, belongs to the malware or the phishing website according to the at least one numerical feature.

* * * * *